Nov. 4, 1941.                R. T. BOOTH                 2,261,841
              FILM SPOOL AND SPINDLE CONSTRUCTION
                       Filed April 6, 1939
Fig. 1.
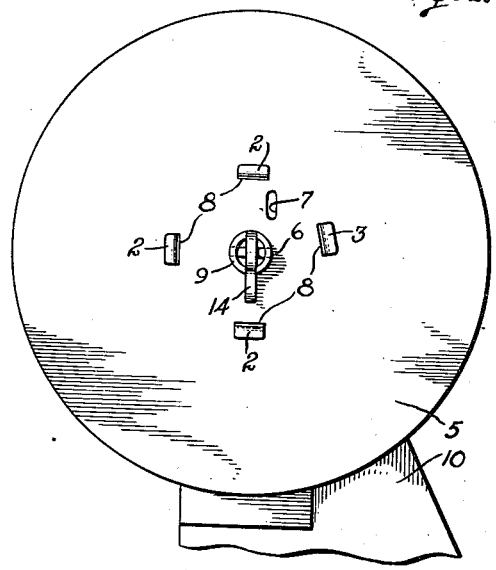
Fig. 2.
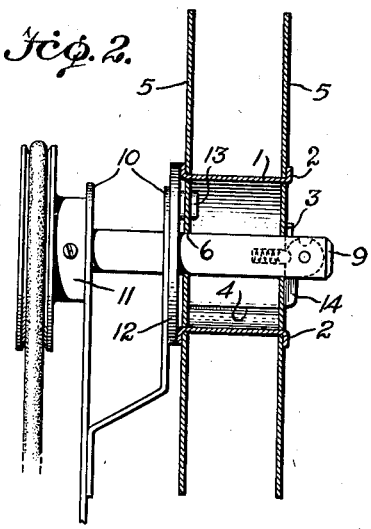
Fig. 3.
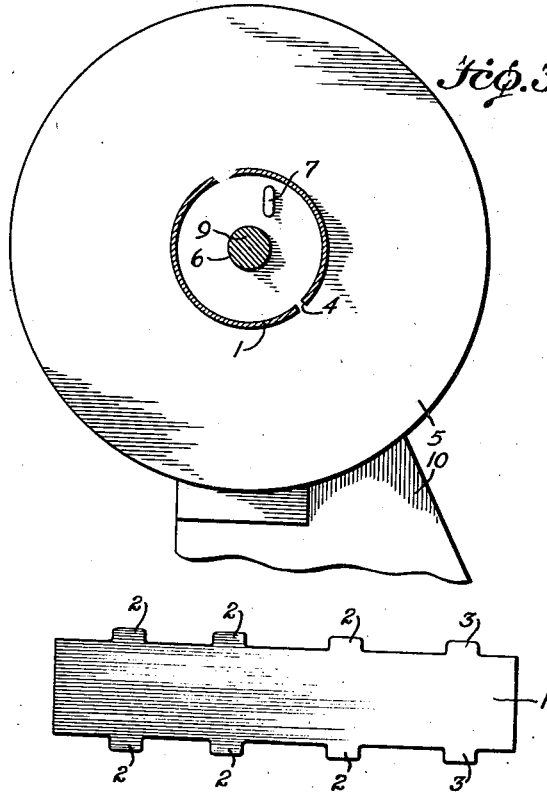
Fig. 4.
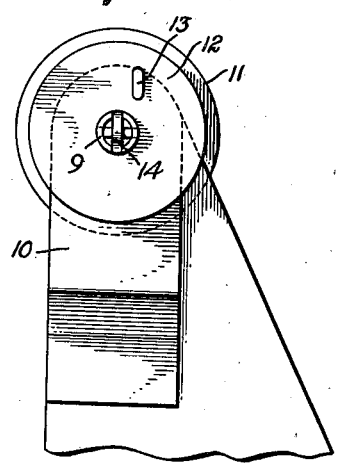
Fig. 5.
Inventor
Roland T. Booth Patented Nov. 4, 1941

2,261,841

UNITED STATES PATENT OFFICE 2,261,841

FILM SPOOL AND SPINDLE CONSTRUCTION

Roland T. Booth, Buffalo, N. Y., assignor to Raymond M. Hessert, Audubon, N. J.

Application April 6, 1939, Serial No. 266,281

8 Claims. (Cl. 242—70)

This invention relates to a film spool and a spindle for mounting said spool adapted for use with document photographing cameras, motion picture machines, projectors, and the like.

The invention comprehends the provision of a film spool and spindle therefor adapted to prevent reverse mounting of the spool on the spindle, for taking up lost motion between the spool and the spindle and holding the spool in a relatively fixed position on the spindle, and provides a construction wherein duplicate spool ends may be used and constructed for assembly in one position only on the opposite ends of a hub portion arranged to cooperate with a corresponding spindle structure for driving the spool.

The invention further comprehends the provision of a film spool wherein duplicate end members are mounted in one position only on opposite ends of a hub portion, means being provided for mounting duplicate spool ends in said one position, while the spool ends are each formed with a spindle opening and a slot arranged in a plane tangential to the opening.

The invention also includes the provision of a spindle for mounting a film spool having end plates of duplicate construction each provided with an aperture for receiving the spindle and a slot arranged in a plane tangential to the opening, in which the spindle has a cylindrical spool-supporting end portion and an annular flange provided with a rib extending in a plane tangential to the periphery of the spindle.

In the drawing:

Fig. 1 shows the film spool of the present invention in elevation.

Fig. 2 is a vertical cross section through the film spool shown in Fig. 1, illustrating how it is mounted on the spindle.

Fig. 3 is a vertical cross section taken on line 3—3 of Fig. 2.

Fig. 4 shows the spindle structure in elevation looking at the free end of the spindle shaft, the reel being omitted.

Fig. 5 is a view illustrating the blank for forming the spool hub.

The film spool of this invention has a hub 1 formed of sheet metal with a plurality of projections on opposite sides indicated at 2 and 3 respectively. The projections on one side of hub 1 are in alignment with the corresponding projections on the opposite side as may be clearly seen from Fig. 5. Projections 2 are equally spaced from one another, while projection 3 is unequally spaced from the two adjacent projections 2 in the completed form of the hub as can be seen in Fig. 1. When the hub is formed into cylindrical shape as shown in Fig. 3, the opposite ends are left in spaced relation as indicated by the numeral 4 to provide a slot in the spool for receiving the end of the film and holding it attached to the spool in a well known manner for the reeling operation.

The spool comprises a pair of end plates 5 of duplicate form. Each end plate is formed of a circular sheet metal disc having a central circular spindle aperture 6. Each end plate is also formed with a slot 7 adjacent to aperture 6 as shown in Fig. 1 arranged with the plane of the slot in tangential relation to aperture 6. As a result, the slot is inclined in the direction of its length to aperture 6 for a purpose that will be presently described. Each end plate is also formed with a plurality of arcuate slots 8 arranged in circumferential relation and spaced apart distances equal to the spacing of tongues 2 and 3 on hub 1, one of the slots being unequally spaced with respect to the adjacent slots in order to receive tongue 3 in the manner shown in Fig. 1. The projections on one end of the hub are adapted to extend through slots 8 of an end plate and be turned outwardly, in the manner shown in Fig. 1, for rigidly securing the end plate on the ends of the hub and holding the hub in cylindrical relation. A second end plate is applied to the opposite end of the hub in the same manner.

By reason of the offsetting of projection 3 at unequal distances from adjacent projections 2, end plates 5 can only be assembled in one position on hub 1. This position brings tangential slots 7 of each end plate in aligned relation and also brings apertures 6 in aligned relation for receiving spindle 9.

Spindle 9 is rotatably mounted in a suitable bearing and supporting structure indicated at 10, Figs. 2 and 4, carries a drive pulley 11 on one end at one side of bearing structure 10 and has an opposite free end projecting beyond the opposite side of bearing structure 10 for receiving and supporting the film spool. A film spool is engaged on the free end of spindle 9 by passing apertures 6 over the shaft which have a size slightly larger than the diameter of the shaft so that it may be readily placed upon the shaft by endwise sliding movement over the free end. An annular flange 12 projects laterally from spindle 9 adjacent bearing portion 10 as shown in Fig. 2 and limits the position of the film spool on the free end portion of spindle 9. This flange has an elongated rib 13 projecting laterally therefrom toward the free end of spindle 9 as shown in Fig. 2 and of sufficient length to extend through tangential slot 7 of one end plate of a film spool adjacent to flange 12. Rib 13 is mounted on flange 12 so that it lies in a plane tangential to the periphery of spindle 9. It is arranged in the same spaced relation from spindle 9, as the arrangement of slot 7 to aperture 6, in order that the end plate of the spool may be engaged on spindle 9 with rib 13 projecting through slot 7 in one end plate only.

The positioning of rib 13 on flange 12 and of slot 7 in end plates 5 prevents the mounting of the film spool on the spindle in the reverse position. In addition, the inclination of rib 13 and of slot 7 relative to a radius of aperture 6 and spindle 9 is such that in the operation of the shaft in either direction rib 13 operates to cam the film spool in a direction laterally to the axis of spindle 9 and thereby takes up any lost motion formed by clearances between apertures 6 and spindle 9 as well as clearances between aperture 7 and rib 13. This results in holding the film spool in a relatively fixed position on spindle 9 with this take-up of lost motion, so that during operation of the film spool in the rotation of spindle 9 the winding of film will be uniform and the end plates will be held against wobbling on the spindle.

The offsetting of projection 3 with respect to projection 2 facilitates the manufacture of the film spools because the end plates can be made in duplicate form and any end plate assembled on any end of any correspondingly built hub. At the same time an end plate can only be assembled on the end of the hub in a fixed position so that when both end plates are in position the slots 7 are in aligned relation and so positioned that the spool can only be placed upon the spindle in one operative position.

A spring-pressed latch mechanism of suitable form indicated at 14 in Figs. 2 and 4 is mounted in the bifurcated end of spindle shaft 9 for the purpose of normally retaining a film spool on the spindle against endwise movement and holding it in the proper position to retain rib 13 in engagement in slot 7 of one end plate of the film spool.

The invention claimed is:

1. A film spool comprising a hub and a pair of duplicate end plates, said hub having a plurality of projections on opposite ends in aligned relation, the projections on each end being all equally spaced from one another except one, said one projection being unequally spaced from adjacent projections, said end plates having openings to receive said projections for mounting said end plates on opposite ends of said hub in only one relative position, and said end plates each having a spindle opening and a slot arranged in a plane tangential thereto, the spindle openings in both end plates being axially aligned and the tangential slots lying in the same plane in the assembled relation of said end plates on said hub.

2. The combination of a reel spindle, a reel removably mounted thereon, said reel having end plates each provided with a spindle receiving opening and a slot at one side of said opening with the plane of its major dimension tangential to said opening, said spindle having a free end portion projecting through said reel spindle openings, and a flange on said spindle adjacent one end plate of the reel mounted thereon having a rib extending laterally therefrom in a plane tangential to the periphery of said spindle and engaging in the tangential slot in the adjacent end plate of said reel for driving said reel with said spindle, retaining said reel in a fixed relation on said spindle with the take up of lost motion therebetween and preventing reverse mounting of said reel thereon.

3. A reel spindle comprising a shaft having a free end portion of cylindrical form, an annular flange spaced inwardly from the extremity of said free end portion, and a fixed elongated narrow rib projecting laterally from said flange toward said free end, formed on the face of said flange facing said free end, located at one side of said shaft and lying in a plane in acute angular relation to the intersecting radii from the axis of said shaft.

4. A film spool comprising a hub and a pair of duplicate end plates mounted on opposite ends of said hub each end plate being formed with a spindle aperture axially aligned with the spindle aperture of the other, and each end plate being formed with a slot at one side of said spindle aperture contiguous thereto and extending in tangential relation to said spindle aperture within the perimeter of said hub for receiving a driving projection on a reel spindle for driving cooperation therewith to drive said spool with said spindle and provide means for preventing the reverse mounting of said spool on said spindle.

5. A film spool comprising a hub and a pair of duplicate end plates mounted on opposite ends of said hub, each end plate being formed with a spindle aperture axially aligned with the spindle aperture of the other, each end plate being provided with an opening contiguous to said spindle opening within the periphery of said hub, said last-mentioned opening having a wall at one side thereof disposed in angular relation to an intersecting radius of said end plate for driving cooperation with an inclined driving face on a spindle mounting, said end plates being arranged on said hubs with said angular walls inclined in the same relation to said spindle apertures to prevent reverse mounting of said spool on said spindle.

6. A film spool comprising a hub and a pair of duplicate end plates mounted thereon, said hub having a plurality of projections on opposite ends, the projections on one end having a corresponding arrangement to those on the other end, the arrangement of said projections on each end being asymmetric with respect to any diameter of the hub, apertures in each end plate having the same arrangement as said projections, whereby during assembly each end plate can be secured on either end of said hub in only one position with said projections engaging in said apertures.

7. A film spool comprising a hub and a pair of duplicate end plates, each end plate having a spindle aperture and a slot in adjacent but spaced relation thereto having its major axis lying in a plane substantially tangential to the periphery of said spindle aperture, and cooperating means for securing said hub and end plates in assembled relation in only one position wherein said spindle apertures are axially aligned and said slots are arranged in the same angular relation to said hub to prevent reverse mounting of said spool on a spindle for driving cooperation with a spool driving rib on said spindle.

8. The combination of a reel spindle having a shaft provided with a free end, a reel slidable over said end, said reel being formed with a spindle opening to receive said shaft, said reel also having a slot formed therein with the plane of its major dimension tangential to the periphery of said spindle opening and spindle, a laterally extending flange on said spindle spaced inwardly from said free end, and a rib on said flange projecting from the side thereof toward the free end of said shaft and arranged in a plane tangential to the periphery of said shaft and engaging in the slot in said reel for driving said reel with said shaft and preventing the reverse mounting of said reel on said shaft while at the same time retaining said reel against rotation relative to said shaft.

ROLAND T. BOOTH.